June 15, 1965  J. PICKLES  3,189,314
VEHICLE SEAT

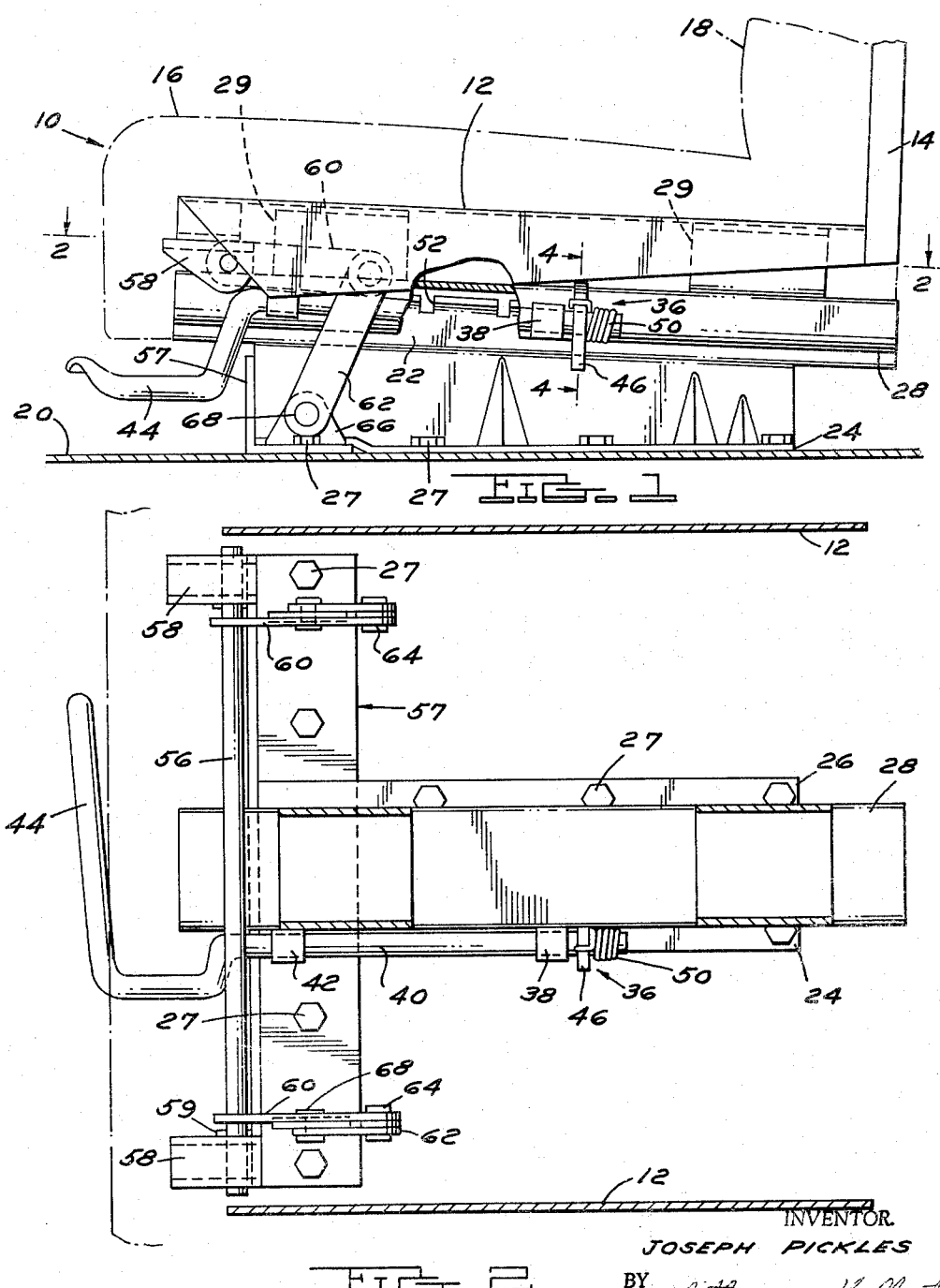

Filed Nov. 26, 1963  2 Sheets-Sheet 2

INVENTOR.
JOSEPH PICKLES
BY Whittemore, Hulbert
& Belknap
ATTORNEYS.

United States Patent Office 3,189,314
Patented June 15, 1965

3,189,314
VEHICLE SEAT
Joseph Pickles, Dearborn, Mich., assignor to Ferro Stamping Company, Detroit, Mich., a corporation of Michigan
Filed Nov. 26, 1963, Ser. No. 326,109
7 Claims. (Cl. 248—429)

This invention relates to a seat supporting and adjusting device and relates more particularly to an improved seat adjuster for a single passenger seat for an automobile.

The prior art illustrates a single adjustment track structure adjacent the transverse center of the seat. Such a construction has the advantage of reducing the overall cost of the seat adjusting mechanism and also eliminates the possibility of binding which is common to the operation of a seat adjuster that utilizes a pair of tracks connected by flexible cables or torsion bars. The prior art also illustrates the use of a sway bar in conjunction with a single adjustment track structure wherein the transversely extending sway bar is located adjacent the center of the seat on the underside thereof to prevent pivoting of the seat frame. Such a construction has many disadvantages in that the length of the seat is held to a minimum as is also the space available underneath the seat for the feet of a person sitting in the back seat of the automobile.

The present invention is an improvement over the prior art single track seat mechanisms in that it locates the stabilizing bar and the cooperating linkage mechanism closely adjacent the front edge of the seat frame on the underside thereof. With such a construction any length of seat may be utilized and in addition it is possible for a person in the back seat of the automobile to have requisite foot space underneath the seat. The vertical load is properly distributed to opposite sides of the seat by means of the stabilizing bar and linkage mechanism which also provide stability for the seat to prevent the seat from turning about the track structure.

It is an object of the present invention to provide a novel seat adjuster having a single longitudinal adjustment track structure located adjacent the transverse center of the seat frame and a stabilizing bar extending transversely of the seat closely adjacent the front edge of the seat so as to adequately distribute part of the vertical load to opposite sides of the seat frame and to provide stability for the seat.

It is thus another object of this invention to provide a simplified low cost structure of the aforementioned type having certain advantages contributing to efficiency, reliability and long life as well as ease of maintenance.

Other objects and features of the invention will become apparent as the description proceeds, especially when taken in conjunction with the accompanying drawings, illustrating a preferred embodiment of the invention, wherein:

FIGURE 1 is a side elevation of the seat supporting mechanism with the seat cushion and a portion of the seat back being illustrated in broken lines.

FIGURE 2 is a horizontal section taken along the line 2—2 of FIGURE 1.

Figure 3:
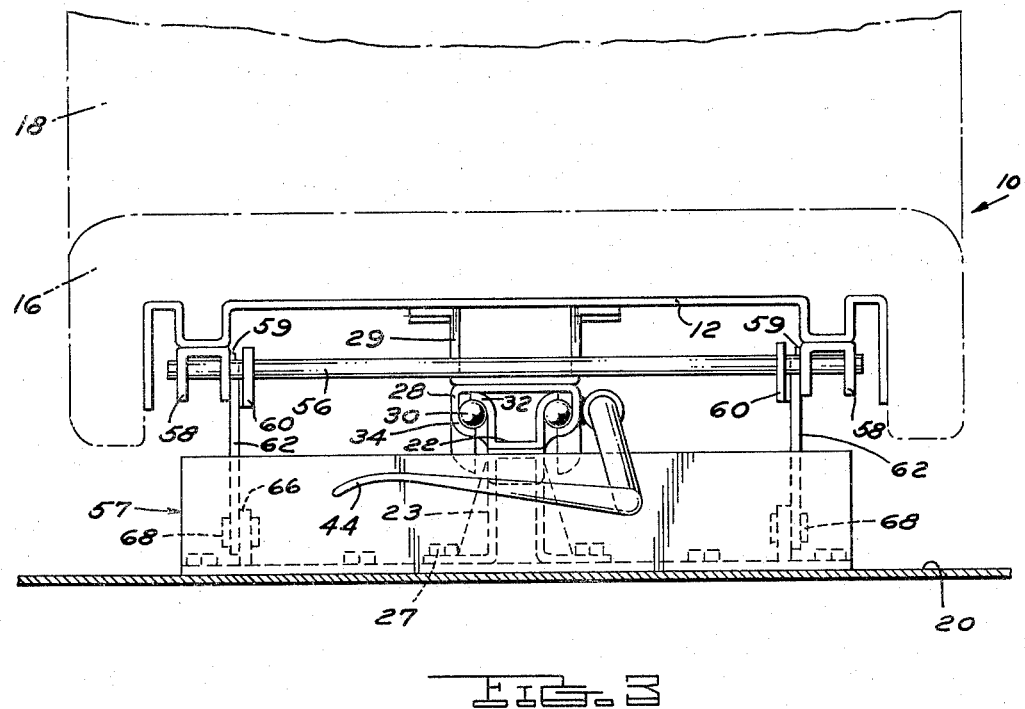
FIGURE 3 is a front view of the seat supporting mechanism.

Referring now to the drawings, FIGURES 1 and 2 illustrate a single passenger seat of the "bucket" type used in modern automobiles. The seat 10 includes a frame 12 which includes at the rear edge thereof a substantially vertically extending back portion 14. A seat cushion 16 and a seat back 18 are mounted on the frame 12 and back portion 14 respectively. The frame 12 is supported for longitudinal movement on a single centrally located adjustment device.

The floor 20 of the automobile forms a fixed support upon which a stationary elongated track 22 is mounted by means of a fixed bracket 23 having a pair of longitudinally extending side flanges 24 and 26. The side flanges 24 and 26 are connected to the floor 20 by bolts 27. As shown in FIG. 2, the track 22 extends longitudinally of the seat frame 12 adjacent the transverse center thereof. A movable elongated track 28 is slidably mounted on the fixed track 22 and is connected to the seat frame 12 at the front and rear of the seat frame 12 by appropriate brackets 29 depending from the frame 12 at the front and rear thereof as best illustrated in FIGURES 1 and 3.

The construction of the tracks 22 and 28 and the means for facilitating the sliding movement between the tracks is well known in the art. Between the tracks 22 and 28 and near each end thereof there is a roller, not shown, for bearing the bulk of the vertical load, and near each end of the tracks 22 and 28 there are anti-friction balls 30 carried in races formed by complementary bent flanges 32 and 34 on the stationary slidable track members 22 and 28 respectively.

Latch means 36 is provided for holding the slidable track 28 at a selected adjusted position with respect to the stationary track 22. A bearing bracket 38 is welded to the slidable track 28 near the longitudinal center of one side thereof to provide a rotatable support for a shaft 40 which extends forwardly of the tracks through a second bearing bracket 42. At the front of the seat 10 the shaft 40 is bent to form an operating handle 44. A latch lug 46 is rigidly mounted on the shaft 40 at the rear end thereof. This lug projects through a slot 47 at one side of the movable track 28 and is urged into engagement with the stationary track 22 by a coil spring 50 mounted on the shaft 40.

Figure 4:
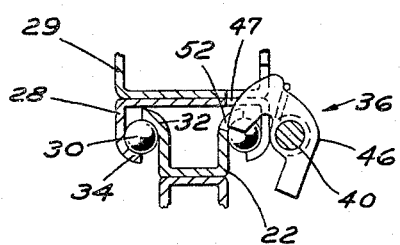
FIGURE 4 is a section through the latch taken along the line 4—4 of FIGURE 1.

As best illustrated in FIGS. 2 and 4, a plurality of notches 52 are formed in one of the side flanges 32 of the stationary track 22 and the latch lug 46 engages a selected one of the notches 52 to hold the tracks 22 and 28 against relative lengthwise movement. When it is desired to longitudinally adjust the position of the seat 10, the operating handle 44 is actuated so as to rotate the shaft 40 in a clockwise direction as seen in FIGURE 4 to retract the lug 46 from the notch 52. With the parts in this position, the seat 10 can be adjusted forward or backward to a desired location, and upon release of the handle 44, the lug 46 will enter another one of the notches 52 when the lug 46 becomes aligned with this other notch 52. A spring (not shown) may be utilized in a conventional manner to facilitate forward movement of the seat 10.

A stabilizing bar 56 is connected between the seat frame 12 and the floor 20 in order to prevent the seat 10 from turning around the centrally disposed single adjustment track and to provide stability for the seat 10. As shown in FIGS. 1–3, the stabilizing bar 56 extends transversely of the seat frame 12 adjacent the front edge thereof and is connected to opposite sides of the seat frame 12 by means of brackets 58 which depend from the seat frame 12 at opposite sides thereof. The brackets 58 have aligned openings which rotatably receive the ends of the stabilizing bar 56. A collar 59 is secured to each end of the bar 56 for preventing movement of the stabilizing bar 56 in directions transverse of the seat 10.

An elongated L-shaped bracket 57 is located beneath the seat 10 near the front edge thereof. The horizontal flange of the bracket 57 is secured to the floor 20 by means of bolts 27. A rearwardly extending lever or crank portion 60 is provided adjacent each end of the stabilizing bar 56. One end of each lever 60 is fixedly secured to the stabilizing bar 56 while the other end, which is free, is pivotally connected to a link 62 by means of a pivot pin 64. Each link 62 is pivotally connected by means of a pin 68 to a support 66 which is fixedly mounted on the bracket 57. The levers 60 and links 62 permit fore and aft adjustment of the seat 10 without jamming the stabilizing bar 56.

The location of the stabilizing bar 56 adjacent the front edge of the seat 10 permits the use of any reasonable length of seat. When the seat 10 is at its forward extremity, to the left as viewed in FIGURE 1, the vertical load on the seat 10 is effectively distributed to the sides of the seat 10 by the stabilizing bar 56. In addition, the stabilizing bar 56 provides lateral stability for the seat 10 so as to prevent turning thereof around the tracks 22 and 28. It should be noted when referring to FIGURE 2 that the greater part of the space underneath the seat 10 is unobstructed. This space is available for the feet of a person utilizing the back seat in the automobile.

The drawings and the foregoing specification constitute a description of the improved vehicle seat in such full, clear, concise and exact terms as to enable any person skilled in the art to practice the invention, the scope of which is indicated by the appended claims.

What I claim as my invention is:

1. A seat supporting and adjusting device comprising a seat frame, a fixed support, a single elongated track located beneath said seat frame adjacent the transverse center thereof and fixedly connected to said support, a single track movably mounted on said fixed track for lengthwise movement and connected to said seat frame adjacent the transverse center thereof, a transversely extending stabilizing bar pivotally connected on opposite ends to said seat frame adjacent the front edge thereof, a pair of levers fixed to said stabilizing bar adjacent each end thereof, said levers extending rearwardly from said stabilizing bar, and a link adjacent each side of said seat frame, each link being pivotally connected to one of said levers and to said fixed support, said stabilizing bar, levers and links providing lateral stability for said seat frame so as to prevent turning of said seat frame around the longitudinal axes of said tracks.

2. The seat supporting and adjusting device defined in claim 1 wherein latch means is carried by said movable track and engageable with said fixed track for holding said seat frame in a selected adjusted position.

3. A seat supporting and adjusting device comprising, a fixed support, a seat frame, adjustment means for moving said seat frame longitudinally, said means including a single track structure having a stationary track connected to said fixed support and a movable track slidably mounted on said stationary track, said movable track being connected to said seat frame adjacent the transverse center thereof, antifriction means between said tracks, and a stabilizing bar extending transversely of said seat frame adjacent the front edge thereof, said stabilizing bar being pivotally connected to said seat frame adjacent opposite sides thereof, said stabilizing bar having a rearwardly extending crank portion at each end pivotally connected through link means to said fixed support at opposite sides of said seat frame to prevent pivoting of said seat frame around the adjustment means, the single track structure and the stabilizing bar and link means comprising the sole support for said seat frame.

4. A seat supporting and adjusting device comprising a seat frame, adjustment means for moving said seat frame longitudinally, said adjustment means including only a single track structure mounted on a fixed support and connected to said seat frame adjacent the transverse center thereof, a stabilizing bar extending transversely of said seat frame adjacent the front edge thereof, said bar being pivotally connected to said seat frame adjacent opposite sides thereof and having a lever near each end thereof extending rearwardly from said stabilizing bar, and a link at each side of said seat frame, each link being pivotally connected to one of said levers and to said fixed support, said stabilizing bar providing lateral stability for said seat frame to prevent turning of said seat frame around the longitudinal axis of the adjustment means.

5. A seat supporting and adjusting device comprising a seat frame, a fixed support, a single elongated track located beneath said seat frame adjacent the transverse center thereof and fixedly connected to said support, a single track movably mounted on said fixed track for lengthwise movement and connected to said seat frame adjacent the transverse center thereof, a transversely extending stabilizing bar pivotally connected on opposite ends to said seat frame adjacent the front edge thereof, a pair of levers fixed to said stabilizing bar adjacent each end thereof, and a link adjacent each side of said seat frame, each link being pivotally connected to one of said levers and to said fixed support, said stabilizing bar, levers and links providing lateral stability for said seat frame so as to prevent turning of said seat frame around the longitudinal axes of said tracks.

6. A seat supporting and adjusting device comprising a seat frame, a fixed support below said seat frame, adjustment means for moving said seat frame longitudinally, said means including a single track structure mounted on said fixed support and connected to said seat frame adjacent the transverse center thereof, a stabilizing bar extending transversely of said seat frame adjacent the front edge thereof, said stabilizing bar being connected to said seat frame adjacent opposite sides thereof, lever means rigidly connected to said stabilizing bar and projecting rearwardly therefrom, and downwardly extending link means pivotally connected to said lever means at the rear thereof and pivotally connected to said fixed support to prevent turning of said seat frame relative to the adjustment means, the single track structure and the stabilizing bar, lever means, and link means comprising the sole support for said seat frame.

7. A seat supporting and adjusting device comprising a seat frame, a fixed support below said seat frame, a single elongated track located beneath said seat frame adjacent the transverse center thereof and fixedly connected to said support, a single track movably mounted on said fixed track for lengthwise movement and connected to said seat frame adjacent the transverse center thereof, a stabilizing bar extending transversely of said seat frame adjacent the front edge thereof, said stabilizing bar being straight throughout its length and connected to said seat frame adjacent opposite sides thereof, lever means connected to said stabilizing bar, and link means connected to said lever means and to said fixed support, said stabilizing bar, lever means and link means providing lateral stability for said seat frame so as to prevent turning of said seat frame relative to the longitudinal axes of said tracks.

References Cited by the Examiner

UNITED STATES PATENTS

| | | | |
|---|---|---|---|
| 1,928,814 | 10/33 | Flintermann | 248—429 |
| 2,307,305 | 1/43 | Saunders et al. | 297—344 |

CLAUDE A. LE ROY, *Primary Examiner.*

FRANK L. ABBOTT, *Examiner.*